A. S. CRAMER.
CAMERA.
APPLICATION FILED APR. 27, 1916.

1,191,066.

Patented July 11, 1916.
2 SHEETS—SHEET 1.

Witnesses
Edwin L. Yewell
Mildred P. Imrie

Inventor
Angie S. Cramer
By
his Attorneys

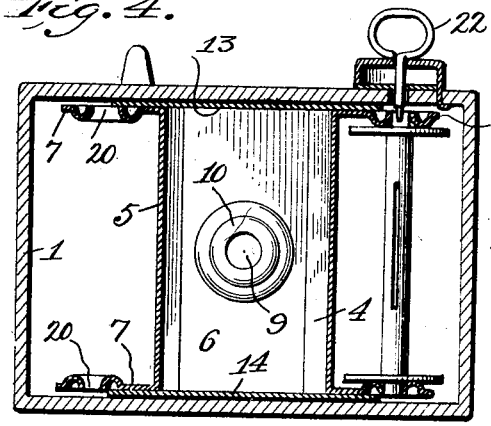
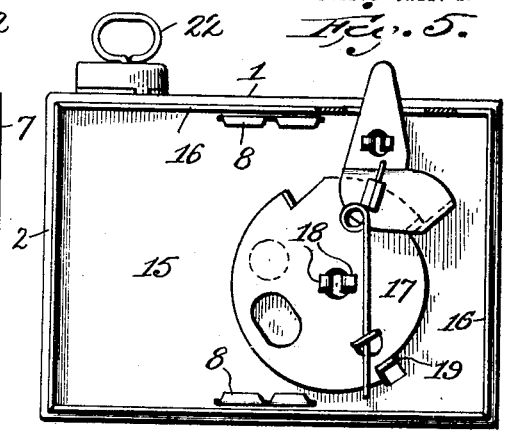
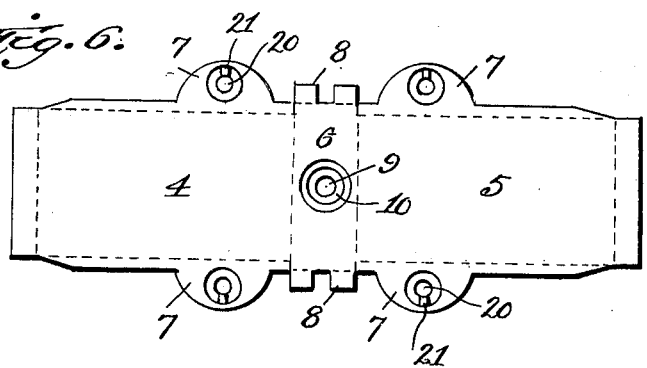
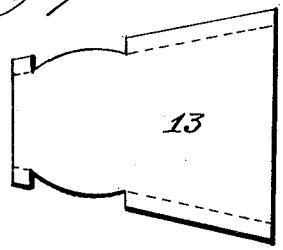
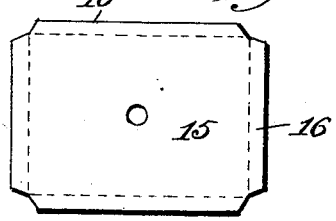
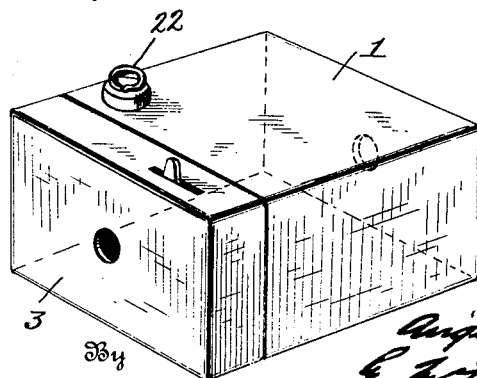

UNITED STATES PATENT OFFICE.

ANGIE S. CRAMER, OF COVINGTON, KENTUCKY.

CAMERA.

1,191,066.  Specification of Letters Patent.  Patented July 11, 1916.

Application filed April 27, 1916.  Serial No. 93,879.

*To all whom it may concern:*

Be it known that I, ANGIE S. CRAMER, of Covington, in the county of Kenton and State of Kentucky, have invented certain new and useful Improvements in Cameras; and I do hereby declare the following to be a full, clear, and exact description of the invention, such as will enable others skilled in the art to which it appertains to make and use the same.

This invention relates to cameras, and the object is to provide a simple and highly efficient device of this character capable of being cheaply manufactured from sheet metal or other material, the camera comprising but a minimum number of parts which may be readily stamped from the metal or other material and quickly assembled, the parts being so arranged that there is little likelihood of the camera getting out of order.

Figure 1:
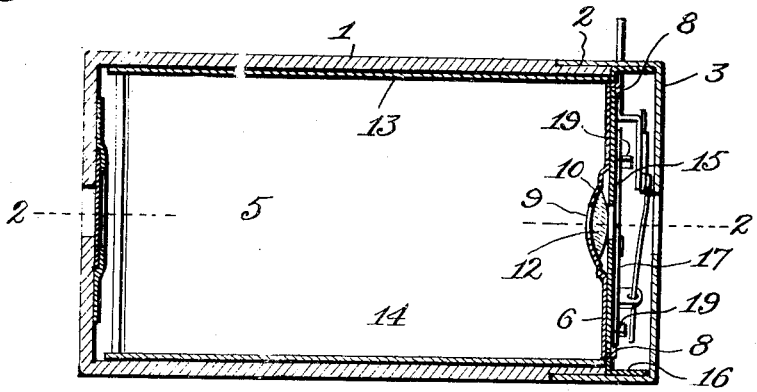
Figure 2:
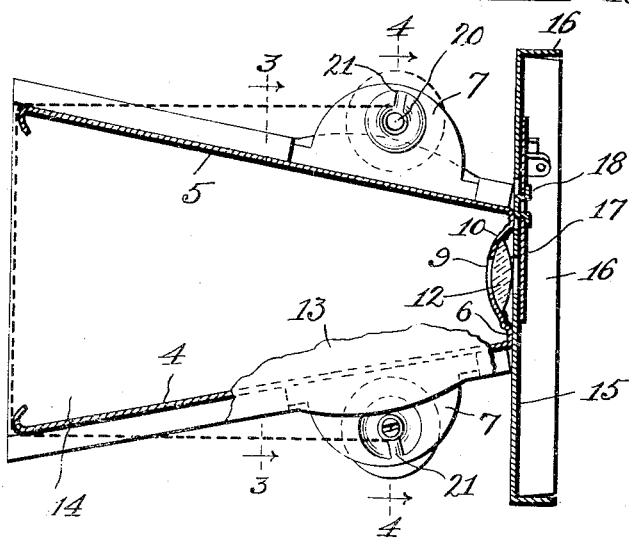
Figure 3:
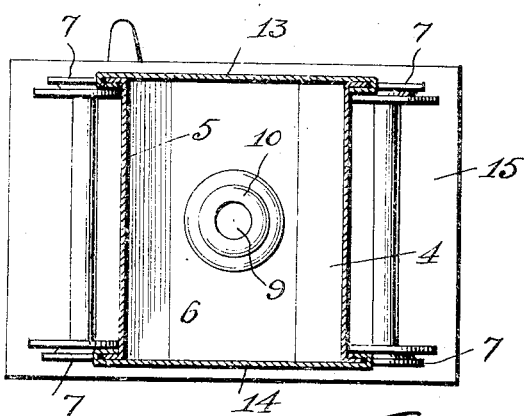

In the accompanying drawings, Figure 1 is a longitudinal sectional view. Fig. 2 is a top plan view of the camera box, parts being shown in section, and others broken away. Fig. 3 is a sectional view on line 3—3, Fig. 2, and Fig. 4 is a similar view on line 4—4, Fig. 2, the camera box being shown within the case. Fig. 5 is a front elevation, with a portion of the camera case removed. Figs. 6, 7 and 8 show views of the blanks from which the camera box is formed. Fig. 9 is a perspective of the complete camera.

Referring to the drawings, 1 designates the outer case of a camera, such case having an open end 2 which is designed to be closed by a lid-like member 3, the latter being provided with the usual lens opening and a slot for the shutter lever. The case may be made of any preferred material, such as card board or sheet metal. At its closed end it has the usual opening through which the film number may be seen.

The camera box, which may also be termed the shadow box, comprises as a whole a front lens retaining wall and side walls, together with upper and lower plates connecting such side walls. The front and side walls are stamped from a single piece of metal to form a frame as shown in Fig. 6, the sides are designated 4 and 5, and the intermediate portion which forms the front wall being indicated at 6. In the blank as stamped are semi-circular extensions or ears 7, oppositely arranged on the sides 4 and 5, and angular tabs or tangs 8 on the front wall. These ears and tangs are designed to be bent at right angles to the walls, the ears forming supports or retaining members for the film spool and the tangs an attaching means for the shutter supporting plate to be hereinafter described. The portions 4 and 5 of the blank are designed to be bent at an obtuse angle to the central portion 6 to provide a gradually increasing area from the wall 6 to the ends of the side walls over which the sensitized film is designed to be stretched. The ends of the side walls are bent back upon themselves so as to provide a smooth guiding edge for the film. In the front wall is a lens opening 9 the metal around such opening being countersunk as at 10 to receive a lens 12.

The camera box may be closed at its top and bottom by upper and lower plates 13 and 14, a portion of the side edges of these plates being bent back upon themselves and designed to grip outwardly extending flanges of the side wall. It is apparent that these upper and lower plates may be omitted, it being only necessary that there be a tight fit between the camera box and its outer case so as to exclude all light from the shadow box or housing.

15 designates the shutter supporting plate. This is formed from a single piece of metal and has its edges outwardly turned to form flanges 16 which act as a guard for the shutter 17 when the lid 3 is placed in position, the edges of the flanges bearing against the lid. The shutter supporting plate is secured to the camera box through the instrumentality of the tangs 8 formed with the front wall and which are designed to be received by slots in the shutter supporting plate and bent to form a rigid connection with the latter. A conventional form of shutter is shown, its support being formed by tangs 18 struck from the shutter supporting plate, thus obviating the necessity of providing screws or other extraneous fastening means. The shutter lever projects through slots in the upper flange of the plate and the lid. Stops for limiting the movement of the shutter are formed in the same manner, that is by striking up the metal of the plate as at 19.

Each of the spool supports 7, formed by bending the ears or extensions of the side walls at right angles thereto, has an open ing 20 to receive the shank of a film spool, the metal around the opening being countersunk to provide a bearing for the disk of the spool. This is clearly shown in Figs. 3 and 4. The shank of the spool is readily inserted in position through ways 21 and the resiliency of the support 7 is sufficient to insure a firm bearing for the spool, preventing wabbling of the latter as it is being unwound from one spool and wound on the other. The tension exerted by the supports on the spool is such as to insure a proper stretching of the film across the open end of the camera box. The winding of the film is effected by a key 22 suitably secured in the outer casing 1 in position to be received by the kerfed upper end of the shank of the winding spool. The engagement of the key with the spool locks the case and the camera box together.

The advantages of my invention are apparent. I have produced an efficient camera embodying but few parts and so simple in construction as to be capable of manufacture at a minimum cost.

I claim as my invention:

1. In a camera, a frame stamped from a single piece of sheet metal, the central portion forming the front wall of the frame and the portions at either side of said front wall being rearwardly bent to form the side walls of the frame, and film spool supports on said side portions.

2. In a camera, a frame stamped from a single piece of sheet metal, the central portion forming the front wall of the frame and the portions at either side of said front wall being rearwardly bent to form the side walls of the frame, and ears formed on said side walls and bent at right angles thereto to form bearings for film spools.

3. In a camera, a frame stamped from a single piece of sheet metal, the central portion forming the front wall of the frame and the portions at either side of said front wall being rearwardly bent to form the side walls of the frame, the extreme ends of said side walls being bent back upon themselves to form guides for the film, and ears formed on said side walls and bent at right angles thereto to form bearings for the film spools.

4. In a camera, a frame stamped from a single piece of sheet metal, the central portion forming an integral lens support and the portions at either side of said central portion being rearwardly bent to form guides for the film, and film spool supports formed on said rearwardly bent portions.

5. In a camera, a frame stamped from a single piece of sheet metal, the central portion forming an integral lens supporting front wall, and the portions at either side of said central portion being rearwardly bent to form side walls for guiding the film, and supports formed on said side walls having countersunk recesses to accommodate film spools.

6. In a camera, a frame stamped from a single piece of sheet metal, the central portion forming a lens supporting front wall, and the portions at either side of said front wall being rearwardly bent to form the side walls of said frame, said side walls having portions thereof bent to form film supports, and shutter mechanism carried by said lens supporting wall.

7. In a camera, a camera box having its front side walls stamped from a single piece of sheet metal, the central portion forming a front or lens supporting wall, and the portions at either side of said central portion being bent to form side walls, said side walls having portions thereof bent to form film spool supports, said supports having countersunk recesses to receive said film spools, a plate secured to said lens supporting wall, and a shutter on said plate.

8. In a camera, a camera box having its front and side walls stamped from a single piece of sheet metal, the central portion forming a front or lens supporting wall, and the portions at either side of said central portion being rearwardly bent to form side walls, said side walls having portions thereof bent to form film spool supports, upper and lower plates connecting said side walls, a plate secured to said lens supporting wall, and a shutter carrier by the latter.

9. In a camera, a camera box having its front and side walls stamped from a single piece of sheet metal, the central portion forming a front or lens supporting wall, and the portions at either side of said central portions being bent to form side walls, a plate secured to the front face of said lens supporting wall and having forwardly extending flanges, and a shutter mounted on said plate within the plane of the outer edges of said flanges.

In testimony whereof, I have signed this specification.

ANGIE S. CRAMER.

Copies of this patent may be obtained for five cents each, by addressing the "Commissioner of Patents, Washington, D. C."